(12) United States Patent
Hara et al.

(10) Patent No.: US 8,039,118 B2
(45) Date of Patent: Oct. 18, 2011

(54) WELDED STEEL PIPE FOR HIGH STRENGTH LINE PIPE SUPERIOR IN LOW TEMPERATURE TOUGHNESS AND METHOD OF PRODUCTION OF THE SAME

(75) Inventors: Takuya Hara, Tokyo (JP); Hitoshi Asahi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 330 days.

(21) Appl. No.: 12/312,885

(22) PCT Filed: Nov. 30, 2007

(86) PCT No.: PCT/JP2007/073622
§ 371 (c)(1),
(2), (4) Date: May 28, 2009

(87) PCT Pub. No.: WO2008/069289
PCT Pub. Date: Jun. 12, 2008

(65) Prior Publication Data
US 2010/0330388 A1 Dec. 30, 2010

(30) Foreign Application Priority Data

Nov. 30, 2006 (JP) ................................. 2006-324176
Nov. 29, 2007 (JP) ................................. 2007-309280
Nov. 30, 2007 (JP) ................................. 2007-310457

(51) Int. Cl.
*B32B 15/18* (2006.01)
*C22C 38/00* (2006.01)
*B21C 37/08* (2006.01)

(52) U.S. Cl. ........ 428/683; 428/586; 428/684; 428/682; 428/638; 138/142; 138/171; 148/521; 148/547; 148/330; 148/332; 148/333; 148/334; 148/335; 148/336; 228/173.4; 228/144

(58) Field of Classification Search ........................ None
See application file for complete search history.

(56) References Cited

U.S. PATENT DOCUMENTS

| 7,879,287 | B2* | 2/2011 | Kobayashi et al. | 420/84 |
| 2003/0121577 | A1* | 7/2003 | Choi et al. | 148/653 |
| 2003/0131914 | A1* | 7/2003 | Jeong et al. | 148/541 |
| 2004/0144454 | A1* | 7/2004 | Jeong et al. | 148/654 |
| 2005/0173030 | A1* | 8/2005 | Jeong et al. | 148/541 |

(Continued)

FOREIGN PATENT DOCUMENTS

JP 62-004826 1/1987

(Continued)

OTHER PUBLICATIONS

International Search Report dated Mar. 18, 2008 issued in corresponding PCT Application No. PCT/JP2007/073622.

*Primary Examiner* — Aaron Austin
(74) *Attorney, Agent, or Firm* — Kenyon & Kenyon LLP

(57) ABSTRACT

The present invention provides high strength welded steel pipe for line pipe inexpensive in cost and superior in low temperature toughness, and a method of production of the same, produced by forming a base material steel plate containing, by mass %, C: 0.010 to 0.050%, Si: 0.01 to 0.50%, Mn: 0.50 to 2.00%, S: 0.0001 to 0.0050%, and Ti: 0.003 to 0.030%, limiting Al to 0.020% or less and Mo to less than 0.10%, having a carbon equivalent Ceq of 0.30 to 0.53 and a crack susceptibility parameter Pcm of 0.10 to 0.20, comprised of polygonal ferrite and residual bainite of an area rate of 20% or less, and having an effective crystal grain size of 20 μm or less, into a pipe shape, then seam welding it and making the effective crystal grain size of the heat affected zone 150 μm or less.

17 Claims, 1 Drawing Sheet

U.S. PATENT DOCUMENTS

| | | | |
|---|---|---|---|
| 2009/0114318 A1* | 5/2009 | Arai et al. | 148/593 |
| 2010/0003535 A1* | 1/2010 | Hara et al. | 428/586 |
| 2010/0236668 A1* | 9/2010 | Hara et al. | 148/521 |
| 2011/0023991 A1* | 2/2011 | Fujishiro et al. | 138/177 |

FOREIGN PATENT DOCUMENTS

| | | |
|---|---|---|
| JP | 08-325635 | 12/1996 |
| JP | 2000-256777 | 9/2000 |
| JP | 2001-355039 | 12/2001 |
| JP | 2003-138340 | 5/2003 |
| JP | 2003-342672 | 12/2003 |
| JP | 2004-35925 | 2/2004 |
| JP | 2004-052104 | 2/2004 |
| JP | 2004-076101 | 3/2004 |
| JP | 2004-143509 | 5/2004 |
| JP | 2005-336514 | 12/2005 |

* cited by examiner

WELDED STEEL PIPE FOR HIGH STRENGTH LINE PIPE SUPERIOR IN LOW TEMPERATURE TOUGHNESS AND METHOD OF PRODUCTION OF THE SAME

This application is a national stage application of International Application No. PCT/JP2007/073622, filed Nov. 30, 2007, which claims priority to Japanese Application Nos. 2006-324176, filed Nov. 30, 2006; 2007-309280, filed Nov. 29, 2007; and 2007-310457, filed Nov. 30, 2007, each of which is incorporated by reference in its entirety.

TECHNICAL FIELD

The present invention relates to high strength welded steel pipe for line pipe superior in low temperature toughness suitable for line pipe for transporting crude oil and natural gas.

BACKGROUND ART

As steel pipe for line pipe used for trunk lines of pipelines important as methods for transporting crude oil, natural gas, and other materials over long distances, high strength, high toughness steel pipe for line pipe has been proposed (for example, Patent Document 1). Up to now, steel pipe for line pipe of the American Petroleum Institute (API) standard X70 (tensile strength 564 MPa or higher) or higher and up to X80 (tensile strength 620 MPa or higher) has been put into practical use, but for the purpose of increasing the efficiency of transport of crude oil and natural gas, studies have been made on increasing the internal pressure of pipelines. Along with this, X70 or higher or further X80 or higher high strength steel pipe for line pipe having a tensile strength of 600 MPa or more is being required to be made further higher in strength and greater in thickness.

Regarding higher strength, for example, if using X120 class line pipe having 900 MPa or higher tensile strength, it is possible to raise the internal pressure, that is, the pressure of the crude oil or natural gas, to about double that of X65 class line pipe, so it becomes possible to transport about double the amount of crude oil or natural gas. Further, if raising the strength of the line pipe and raising the internal pressure resistance strength, compared with increasing the thickness, it becomes possible to slash the material costs, transport costs, and on-site welding costs and possible to greatly raise the pipeline laying costs.

Further, a pipeline has to be superior in low temperature toughness since it is often laid in cold regions. Further, at the time of installation, the ends of the line pipes are joined together, so superior on-site weldability is also demanded. X120 class steel pipe for line pipe satisfying such demands and higher in strength than even the steel pipe for line pipe proposed in Japanese Patent Publication (A) No. 62-4826 is being proposed (for example, Japanese Patent Publication (A) No. 2004-52104). This is high strength steel pipe for line pipe of a microstructure of the base material mainly comprised of a mixed structure of bainite and martensite. Further, for increased thickness, methods of production of thick-gauge steel plate with a metal structure made fine bainite by controlled rolling and controlled cooling and having a good strength and toughness is being proposed (for example, Japanese Patent Publication (A) No. 2000-256777, Japanese Patent Publication (A) No. 2004-76101, and Japanese Patent Publication (A) No. 2004-143509).

Steel pipe for line pipe is produced by forming thick-gauge steel plate into a pipe shape by the UO process, making the ends abut against each other, and seam welding them. When toughness and productivity are demanded such as in high strength steel pipe for line pipe, the seam welding is preferably submerged arc welding from the inner surface and outer surface. When welding a steel material a plurality of times in this way, there is the problem that the weld heat affected zone (called the "HAZ") coarsened by the heat input in the preceding welding is reheated by the heat input of the subsequent heat input and therefore the toughness drops.

As technology for improving the low temperature toughness of the HAZ of high strength steel pipe for line pipe, the method of utilizing intragranular transformation to make the structure of the HAZ finer has been proposed (for example, Japanese Patent Publication (A) No. 8-325635, Japanese Patent Publication (A) No. 2001-355039, and Japanese Patent Publication (A) No. 2003-138340). The method proposed in Japanese Patent Publication (A) No. 8-325635 causes the formation of acicular ferrite as nuclei for oxides. The method proposed in Japanese Patent Publication (A) No. 2001-355039 and Japanese Patent Publication (A) No. 2003-138340 forms intragranular bainite using composite inclusions of oxides and sulfides as nuclei.

Most such conventional high strength steel pipes for line pipe increase the hardenability, increase the Mo effective for raising the strength, and obtain a mainly bainite metal structure to improve the toughness, but recently a reduction in the content of the expensive element Mo is being sought. However, if reducing the Mo, the hardenability easily falls and intragranular bainite becomes harder to obtain, so securing low temperature toughness of the HAZ has been difficult. Further, conventional high strength line pipe has a thickness of at most less than 25 mm. Thick line pipe of 25 mm or more or 30 mm or more is being demanded.

DISCLOSURE OF THE INVENTION

The present invention provides inexpensive high strength welded steel pipe for line pipe superior in low temperature toughness which can secure the low temperature toughness of the HAZ in particular even if limiting the content of Mo and a method of production of the same.

Further, the inventors prepared X70 or X80 or higher high strength thick-gauge steel plate for line pipe having a plate thickness of 25 mm or more and a tensile strength (TS) of 600 MPa or more. As a result, it was learned that the problems due to the increase of plate thickness of steel plate were far more serious than anticipated. In particular, at the center part of plate thickness, the rolling by the controlled rolling and the cooling speed due to the controlled cooling become insufficient so the toughness remarkably drops compared with the surface layer part of the steel plate. Further, the inventors investigated the metal structure of the center part of plate thickness of steel plate and as a result obtained the discovery that in high strength thick-gauge steel plate for line pipe, it is extremely difficult to make the center part of plate thickness a fine bainite structure.

The present invention solves such problems unanticipated from the prior art and provides inexpensive, thick, high strength welded steel pipe for line pipe superior in low temperature toughness able to limit the content of Mo even if having a thickness of 25 mm or more, further 30 mm or more, and a method of production of the same.

The present invention reduces the C and Al and includes a suitable amount of Ti to promote intragranular transformation and, further, adds a suitable amount of B to raise the hardenability, controls the hardenability parameter of the carbon equivalent Ceq and the weldability parameter of the crack susceptibility parameter Pcm to optimum ranges, makes the base material and HAZ a fine metal structure mainly comprised of bainite even if limiting the content of Mo, and utilizes the intragranular bainite formed using oxides of Ti as nuclei to improve the low temperature toughness of the HAZ by increasing the fineness of the effective crystal grain size of the HAZ to thereby obtain high strength welded steel pipe for line pipe able to be increased in thickness and has as its gist the following:

(1) High strength welded steel pipe for line pipe superior in low temperature toughness comprising steel pipe obtained by seam welding a base material steel plate formed into a pipe shape, wherein said base material steel plate has a composition of ingredients containing, by mass %, C: 0.010 to 0.050%, Si: 0.01 to 0.50%, Mn: 0.50 to 2.00%, S: 0.0001 to 0.0050%, Ti: 0.003 to 0.030%, O: 0.0001 to 0.0080%, and B: 0.0003 to 0.0030%, limiting P to 0.050% or less, Al to 0.020% or less, and Mo to less than 0.10%, and having a balance of iron and unavoidable impurities, a Ceq found from the following formula 1 is 0.30 to 0.53, a Pcm found by the following formula 2 is 0.10 to 0.20, a metal structure of said base material steel plate is comprised of an area ratio of 20% or less of polygonal ferrite and an area ratio of 80% or more of bainite, an effective crystal grain size is 20 µm or less, and an effective crystal grain size of the weld heat affected zone is 150 µm or less:

$$Ceq=C+Mn/6+(Ni+Cu)/15+(Cr+Mo+V)/5 \quad \text{formula 1}$$

$$Pcm=C+Si/30+(Mn+Cu+Cr)/20+Ni/60+Mo/15+V/10+5B \quad \text{formula 2}$$

where C, Si, Mn, Ni, Cu, Cr, Mo, V, and B are the contents (mass %) of the individual elements (2) High strength welded steel pipe for line pipe superior in low temperature toughness as set forth in the above (1) characterized in that the thickness of the base material steel plate is 25 to 40 mm.

(3) High strength welded steel pipe for line pipe superior in low temperature toughness as set forth in the above (1) or (2) characterized in that a tensile strength of said base material steel plate using the circumferential direction of said steel pipe as the tension direction is 600 to 800 MPa.

(4) High strength welded steel pipe for line pipe superior in low temperature toughness as set forth in any one of the above (1) to (3) characterized in that said base material steel plate further contains, by mass %, one or both of Cu: 0.05 to 1.50% and Ni: 0.05 to 5.00%.

(5) High strength welded steel pipe for line pipe superior in low temperature toughness as set forth in any one of the above (1) to (4) characterized in that said base material steel plate further contains, by mass %, one or more of Cr: 0.02 to 1.50%, V: 0.010 to 0.100%, Nb: 0.001 to 0.200%, Zr: 0.0001 to 0.0500%, and Ta: 0.0001 to 0.0500%.

(6) High strength welded steel pipe for line pipe as set forth in any one of the above (1) to (5) characterized in that said base material steel plate further contains, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, Re: 0.0001 to 0.0050%, and W: 0.01 to 0.50%.

(7) High strength welded steel pipe for line pipe superior in low temperature toughness as set forth in any one of the above (1) to (6) characterized in that the weld metal contains, by mass %, C: 0.010 to 0.100%, Si: 0.01 to 0.50%, Mn: 1.0 to 2.0%, Al: 0.001 to 0.100%, Ti: 0.003 to 0.050%, and O: 0.0001 to 0.0500%, limits P to 0.010% or less and S to 0.010% or less, and has a balance of iron and unavoidable impurities.

(8) High strength Welded steel pipe for line pipe superior in low temperature toughness as set forth in the above (7) characterized in that said weld metal further contains, by mass %', one or both of Ni: 0.2 to 3.2% and
Cr+Mo+V: 0.2 to 2.5%.

(9) A method of production of high strength welded steel pipe for line pipe superior in low temperature toughness characterized by producing steel during which adding Si and Mn for weak deoxidation, then adding Ti to adjust the ingredients to those described in any one of (1) and (4) to (6), casting the steel, hot rolling the obtained steel slab, and further forming the obtained steel plate into a pipe shape and seam welding the seam portions.

(10) A method of production of high strength welded steel pipe for line pipe superior in low temperature toughness as set forth in the above (9) characterized by heating said steel slab to 1000° C. or more, hot rolling it by a rolling ratio in a pre-recrystallization temperature region of 2.5 or more, and stopping water cooling at 600° C. or less.

(11) A method of production of high strength welded steel pipe for line pipe superior in low temperature toughness as set forth in the above (9) or (10) characterized by forming said steel plate into a pipe shape by a UO process, welding the seam portions from the inner and outer surfaces by submerged arc welding using welding wire and a firing type or molten type flux, then expanding the pipe.

(12) A method of production of high strength welded steel pipe for line pipe superior in low temperature toughness as set forth in the above (11) characterized in that a heat input of said submerged arc welding is 4.0 to 10.0 kJ/mm.

(13) A method of production of high strength welded steel pipe for line pipe superior in low temperature toughness as set forth in any one of the above (9) to (12) characterized by heat treating the seam weld zone.

(14) A method of production of high strength welded steel pipe for line pipe superior in low temperature toughness as set forth in the above (13), characterized in that the seam weld zone is heat treated in the range of 300 to 500° C.

BEST MODE FOR CARRYING OUT THE INVENTION

Figure 1:
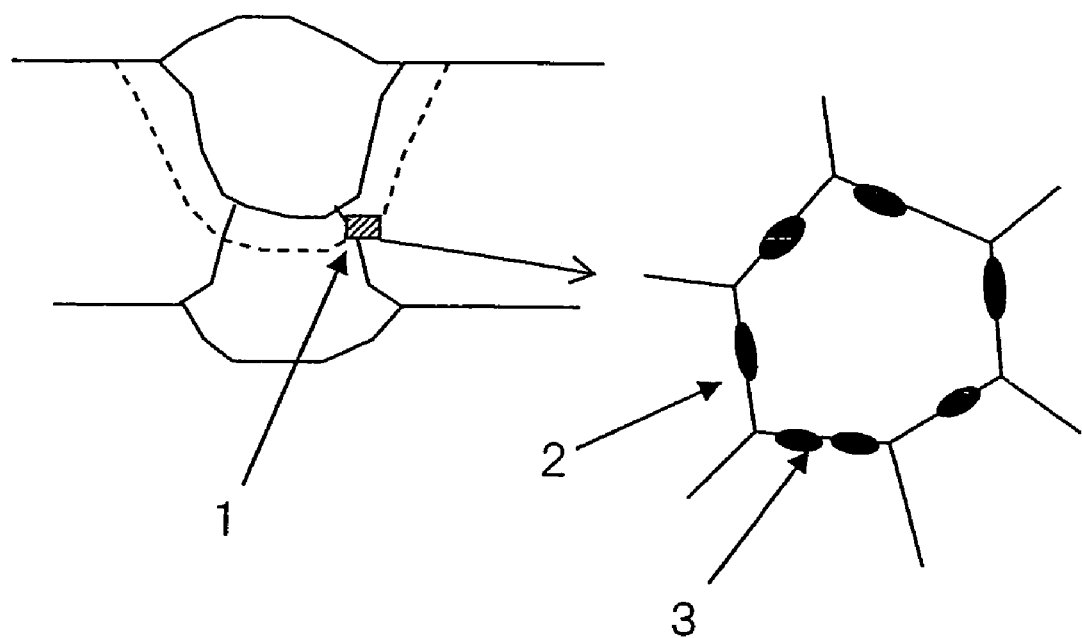
FIG. 1 is a schematic view of a reheated HAZ.

The present invention is welded steel pipe made of a steel material reducing the content of C and making the metal structure a low temperature transformed structure mainly comprised of bainite to improve the toughness in which instead of limiting the content of the Mo, a hardenability parameter Ceq and weldability parameter Pcm are made optimum ranges and further in which B is added to raise the hardenability and intragranular bainite is utilized in particular to make the effective crystal grain size of the HAZ finer and improve the low temperature toughness. That is, the present invention has as its greatest feature the reduction of the amount of Al, the control of the amount of oxygen and addition of a suitable amount of Ti to disperse fine inclusions extremely effective as the nuclei for intragranular transformation of the base material steel plate, and the utilization of these as nuclei for intragranular transformation to make the effective crystal grain size finer. Note that, below, the base material steel plate will also simply be referred to as "steel plate" and the welded steel pipe will also simply be referred to as "steel pipe".

The intragranular bainite of the HAZ is obtained by transformation of the intragranular ferrite formed by intragranular transformation at a high temperature using the above-mentioned fine inclusions as nuclei at the time of cooling. Therefore, making the hardenability parameter Ceq and weldability parameter Pcm the optimum ranges is extremely effective for forming intragranular bainite at the HAZ of the steel pipe limiting the amount of addition of Mo such as in the present invention. Due to the formation of this intragranular bainite, the low temperature toughness of the HAZ is remarkably improved. Further, intragranular bainite may contribute to suppression of softening of the HAZ as well.

The mechanism of formation of the intragranular bainite is believed to be as follows: anion-hole type oxides can hold large numbers of ions of Mn. Further, MnS easily precipitates as a composite in oxides. For this reason, an Mn depleted layer is formed around the oxides and sulfides. This Mn-depleted layer acts as nuclei for transformation when heating steel to a high temperature where the metal structure becomes an austenite phase then cooling it. Usually, petal shaped intragranular ferrite is formed. This intragranular ferrite has a large supercooling degree when the cooling speed is fast or the hardenability is high. At the time of cooling, it transforms to bainite to become intragranular bainite.

A typical anion-hole type oxide is a fine oxide mainly comprised of Ti. Petal type intragranular bainite is formed using this as nuclei. Further, fine sulfides mainly comprised of Mn coprecipitate as fine oxides mainly comprised of Ti. Note that, depending on the composition of ingredients of the steel, sometimes the oxides include one or more of Al, Si, Mn, Cr, Mg, and Ca and the sulfides include one or more of Ca, Cu, and Mg. The size of inclusions forming the nuclei of intragranular bainite can be measured by a transmission type electron microscope (TEM). A size of 0.01 to 5 μm in range is preferable.

When a large amount of intragranular bainite forms in the HAZ, the mixture of martensite and austenite (Martensite-Austenite Constituent, called "MA") forming the starting points of fracture becomes finer and the low temperature toughness is greatly improved. If keeping the amount of C down to 0.05% or less and making the fine inclusions disperse, intragranular bainite is formed, the intragranular structure becomes finer, and the Charpy fracture unit, that is, the effective crystal grain size, also becomes smaller. Further, intragranular bainite is harder than intragranular ferrite, so formation of intragranular bainite can suppress the softening of the HAZ.

At the HAZ of the center part of thickness of the high strength welded steel pipe for line pipe (near the part of ½ of the thickness, called the "½t part"), as shown schematically in FIG. 1, the coarse MA present along the old austenite grain boundaries of the reheated HAZ become starting points of fracture and sometimes impair the toughness. In FIG. 1, 1 indicates the reheated HAZ, 2 a mixture of martensite and austenite, and 3 an old austenite grain boundary. The "reheated HAZ" is the portion of the weld metal and HAZ near the weld line in the preceding welding being reheated by subsequent welding. Usually, the HAZ, while differing somewhat due to the heat input at the time of welding, is the portion within 10 mm from the weld line. For example, when providing notches at positions 1 mm or 2 mm from the weld line, the Charpy absorption energy at −40° C. sometimes becomes less than 50 J.

The inventors engaged in intensive research for obtaining low temperature toughness of the base material steel plate and HAZ of welded steel pipe and as a result discovered the following. Mainly Ti fine oxides, composite oxides, and composite sulfides are effective for formation of intragranular bainite of the HAZ and, further, are effective for increasing the fineness of the effective crystal grain size of the base material. Due to this, the effective crystal grain size of the HAZ can be made 150 μm or less and the effective crystal grain size of the base material steel plate can be made 20 μm or less.

Further, when limiting the content of Mo to less than 0.10%, if making the hardenability parameter of the carbon equivalent Ceq 0.30 to 0.53 and making the weldability parameter of the crack susceptibility parameter Pcm 0.10 to 0.20, the area ratio of the polygonal ferrite of the base material steel plate becomes 20% or less, the area ratio of the bainite becomes 80% or more, and the intragranular transformed structure of the HAZ becomes intragranular bainite. Due to this, the tensile strength of the seam welded weld joint becomes 600 MPa or more.

In particular, if the thickness becomes 25 mm or more and, further, 30 mm or more, the toughness of the ½t part of the base material steel plate sometimes falls, but due to the mainly Ti fine oxides, composite oxides, and composite sulfides, the base material steel plate can be made finer in effective crystal grain size. The reason is considered to be as follows. First, when rolling in the pre-recrystallization temperature region is secured, transformation from the usual grain boundaries is promoted, so intragranular transformation from the oxides, composite oxides, and composite sulfides becomes difficult. This is believed to be because if securing rolling results in a smaller crystal grain size, compared with intragranular transformation, the speed of growth of bainite formed from nuclei at the grain boundaries becomes too great. That is, it is believed that before the intragranular transformation, the transformation from the grain boundaries ends up being completed.

On the other hand, when the rolling ratio in the pre-recrystallization temperature region is not sufficient, the crystal grain size becomes coarser in particular at the center part of the plate thickness, so the growth of bainite formed from the grain boundary also becomes slower. For this reason, it is believed that the effective crystal grain size becomes finer due to the intragranular transformation from the mainly Ti oxides, composite oxides, and composite sulfides. Further, it is believed that the fine oxides act as pinning particles and suppress growth of crystal grains which is also effective for increasing the fineness of the effective crystal grain size of the base material steel plate.

According to the present invention, in particular, even if the thickness is 25 mm or more, the effective crystal grain size of the base material steel plate can be made 20 μm or less. Further, by making the area ratio of the polygonal ferrite 20% or less and making the area ratio of bainite 80% or more, the Charpy absorption energy at −40° C. of a test piece taken from near the surface, that is, a position of about 2 to 12 mm from the surface of the steel material, becomes 200 J or more. The Charpy absorption energy when taking it from the ½t part, that is, substantially the center of thickness, can be made 100 J or more.

In the present invention, control of the amount of oxygen in the steelmaking process is extremely important for forming mainly Ti fine oxides, composite oxides, and composite sulfides. In particular, when adjusting the composition of ingredients of the steel, it is necessary to add Si and Mn so that the contents become the above-mentioned ranges for weak deoxidation, then add Ti. The oxygen concentration when adding Ti is preferably 0.001 to 0.003%. Due to this, it is possible to disperse Ti oxides, specifically, $Ti_2O_3$, of a grain size of 0.01 to 10 μm and a number per 1 μm² area of 10 to 1000/mm². Due to this, formation of the intragranular transformation is promoted and the base material steel plate and HAZ of the welded steel pipe become finer in effective crystal grain size.

When adjusting the composition of ingredients by such a steelmaking process and hot rolling the cast steel slab, by making the rolling ratio from 900° C. to the end of rolling 2.5 or more, preferably 3.0 or more, it is possible to make the effective crystal grain size of the base material steel plate 20 μm or less.

The effective grain size is the value obtained using EBSP to convert an area surrounded by boundaries having a crystal orientation difference of 15° or more to the circle equivalent diameter. Further, "polygonal ferrite" is observed as white mass-shaped structures not including coarse cementite, MA, or other coarse precipitates in the grains in the optical microscope structure. In the optical microscope structure of the base material steel plate, martensite, residual austenite, and MA are sometimes included as the balance of polygonal ferrite and bainite.

In the present invention, bainite is defined as a structure where carbides precipitate between the laths or masses of ferrite or where carbides precipitate in the laths. Further, martensite is a structure where carbides do not precipitate between the laths or in the laths. The residual austenite is austenite formed at a high temperature which remains in the base material steel plate or welded steel pipe.

Further, due to the heat treatment of the weld zone, the coarse MA formed along the old austenite grain boundaries of the HAZ breaks down into fine cementite, so the low temperature toughness is improved. Due to this, the associated part of the ½t part or the associated part+1 mm at a low temperature is improved in toughness. For example, if heating the weld zone to 300 to 500° C. in temperature, the V-notch Charpy absorption energy at the low temperature of −40° C. can be made 50 J or more. Therefore, when used at an extremely low temperature of −40° C. or less, it is preferable to further heat treat the structure forming intragranular bainite and obtain a mixed structure of intragranular bainite and cementite.

Below, the reasons for limitation of the base material steel plate of the present invention will be explained. Note that the HAZ is the heat affected zone which does not melt at the time of welding, so the ingredients of the HAZ are the same as the base material.

C: C is an element raising the strength of the steel, but in the present invention, the content of C is limited to obtain a metal structure mainly comprised of bainite and achieve both high strength and high toughness. If the amount of C is smaller than 0.010%, the strength is insufficient. If over 0.050%, the toughness falls. For this reason, in the present invention, the optimum amount of C is made 0.010 to 0.050% in range.

Si: Si is a deoxidizing element important in the present invention. To obtain this effect, inclusion of 0.01% or more of Si in the steel is required. On the other hand, if the content of Si is over 0.50%, the toughness of the HAZ falls, so the upper limit is made 0.50%.

Mn: Mn is an element used as a deoxidizing agent, is necessary for securing the strength and toughness of the base material steel plate, and, further, forms MnS and other sulfides effective as nuclei for intragranular transformation. It is extremely important in the present invention. To obtain these effects, it is necessary to include 0.50% of Mn, but if the content of Mn exceeds 2.00%, the toughness of the HAZ is impaired. Therefore, the range of content of the Mn is made 0.50 to 2.00%. Note that, Mn is an inexpensive element, so to secure the hardenability, is preferably included in 1.00% or more. The optimum lower limit is 1.50% or more.

P: P is an impurity and remarkably lowers the toughness of the base material steel plate if included in over 0.050%. Therefore, the upper limit of the content of P was made 0.050%. To raise the toughness of the HAZ, the content of P is preferably made 0.010% or less.

S: S, in the present invention, is an important element for forming MnS and other sulfides effective as nuclei for intragranular transformation. If the content of S becomes less than 0.0001%, the amount of formation of sulfides falls and intragranular transformation does not remarkably occur, so it has to be made 0.0001% or more. On the other hand, if the base material steel plate contains S in over 0.0050%, coarse sulfides are formed and the toughness is reduced, so the upper limit of the amount of S is made 0.0050% or less. To raise the toughness of the HAZ, the upper limit of the amount of S is preferably made 0.0030% or less.

Al: Al is a' deoxidizing agent, but in the present invention, to make oxides of Ti finely disperse, it is extremely important to make the upper limit of the amount of Al 0.020% or less. Further, to promote the intragranular transformation, the amount of Al is preferably made 0.010% or less. Further, the preferable upper limit is 0.008% or less.

Ti: Ti, in the present invention, is an extremely important element for making oxides of Ti, which effectively act as nuclei for intragranular transformation, finely disperse. However, if including Ti in excess, carbonitrides are formed and the toughness is impaired. Therefore, in the present invention, the content of Ti has to be made 0.003 to 0.030%. Further, Ti is a powerful deoxidizing agent, so if the amount of oxygen when adding Ti is large, coarse oxides are formed. For this reason, when producing steel, it is necessary to deoxidize the steel in advance by Si and Mn and lower the amount of oxygen. If the oxides of Ti become coarser, intragranular transformation becomes difficult and the effect of pinning the grain boundaries becomes smaller, so the effective crystal grain size of the base material steel plate and the HAZ of the welded steel pipe sometimes becomes coarser.

B: B is an element causing an increase in the hardenability if becoming solid solute in steel, but if added in excess, forms coarse BN and in particular causes a decrease in the toughness of the HAZ, so the upper limit of the amount of B is made 0.0030%. The welded steel pipe of the present invention adds B, which raises the hardenability, in an amount of 0.0003% or more and controls the hardenability parameter of the carbon equivalent Ceq and the weldability parameter of the crack susceptibility parameter Pcm to the optimum ranges to secure the strength and weldability. Note that addition of 0.0003% or more of B is also effective for suppressing the formation of ferrite from the grain boundaries. Further, due to the deliberate addition of B, if fine BN is formed, the solid solute N falls and along with this the toughness of the HAZ rises, so it is preferable to make the amount of B over 0.0005%.

Mo: Mo is a useful element raising the hardenability to promote the formation of intragranular bainite at the HAZ and, further, forming carbonitrides to raise the strength, but the addition of 0.10% or more results in increased alloy costs. Therefore, in the present invention, the content of the expensive Mo is restricted to less than 0.10%. The welded steel pipe of the present invention controls the hardenability parameter of the carbon equivalent Ceq and the weldability parameter of the crack susceptibility parameter Pcm to the optimum ranges so that the hardenability can be secured even if reducing the content of Mo.

O: Oxygen is an element unavoidably included in steel, but in the present invention, to form oxides containing Ti, the amount of O has to be limited. The amount of the oxygen remaining in the steel during casting, that is, the amount of O in the base material steel plate, has to be made 0.0001 to 0.0080%. This is because if the amount of O is less than 0.0001%, the number of oxide particles is not sufficient, while if over 0.0080%, the number of coarse oxide particles becomes greater and the base material and the toughness of the HAZ are impaired. Further, if the increase in the amount of oxygen results in coarsening of the mainly Ti oxides, the base material steel plate and HAZ of the welded steel pipe become coarser in effective crystal grain size.

Further, as elements improving the strength and toughness, it is also possible to add one or more of Cu, Ni, Cr, V, Nb, Zr, and Ta. Further, when the contents of these elements are lower than the preferable lower limits, there is no particular detrimental effect, so these elements can be deemed as impurities.

Cu and Ni: Cu and Ni are effective elements raising the strength without lowering the toughness. To obtain that effect, the lower limits of the amount of Cu and the amount of Ni are preferably made 0.05% or more. On the other hand, the upper limit of the amount of Cu is preferably 1.50% to suppress the formation of cracks at the time of heating and welding the steel slab. The upper limit of the amount of Ni is preferably 5.00% since inclusion in excess impairs the weldability. Note that, Cu and Ni are preferably included as a composite to suppress the formation of surface defects. Further, from the viewpoint of the cost, the upper limits of the Cu and Ni are preferably made 1.00% or less.

Cr, V, Nb, Zr, and Ta: Cr, V, Nb, Zr, and Ta are elements forming carbides and nitrides and raising the strength of the steel by precipitation strengthening. One or more may be included. To effectively raise the strength, the lower limit of the amount of Cr is 0.02%, the lower limit of the amount of V is 0.010%, the lower limit of the amount of Nb is 0.001%, and the lower limits of the amount of Zr and the amount of Ta are both 0.0001%. On the other hand, if excessively adding Cr, due to the rise in the hardenability, the strength rises and the toughness is sometimes impaired, so the upper limit of the amount of Cr is preferably made 1.50%. Further, if excessively adding V, Nb, Zr, and Ta, the carbides and nitrides become coarser and the toughness is sometimes impaired, so the upper limit of the amount of V is preferably made 0.100%, the upper limit of the amount of Nb is preferably made 0.200%, and the upper limits of the amounts of Zr and Ta are preferably both made 0.0500%.

Further, to control the form of the inclusions and improve the toughness, it is possible to add one or more of Mg, Ca, REM, Y, Hf, Re, and W. Further; if the contents of these elements are lower than the preferable lower limits, there is no particular detrimental effect, so these elements can be deemed as impurities.

Mg: Mg is an element effective for increasing the fineness of oxides and controlling the form of the sulfides. In particular, to obtain the effect of the fine oxides of Mg acting as nuclei for intragranular transformation and, further, suppressing the coarsening of the grain size as pinning particles, addition of 0.0001% or more is preferable. On the other hand, if adding an amount of Mg over 0.0100%, coarse oxides are formed and the toughness of the base material steel plate and the HAZ of the welded steel pipe is sometimes lowered; so the upper limit of the amount of Mg is preferably made 0.0100%.

Ca and REM: Ca and REM are elements useful for control of the form of the sulfides and forming granules to suppress the formation of MnS stretched in the rolling direction and improve the characteristics of the steel material in the plate thickness direction, in particular, the lamellar tear resistance. To obtain this effect, the lower limits of the amount of Ca and the amount of REM are both preferably made 0.0001% or more. On the other hand, if the upper limits of the amount of Ca and the amount of REM are over 0.0050%, the oxides increase, fine Ti-containing oxides are reduced, and intragranular transformation is sometimes inhibited, so 0.0050% or less is preferable.

Y, Hf, Re, and W: Y, Hf, W, and Re are elements having effects similar to Ca and REM. If excessively added, intragranular transformation is sometimes inhibited. For this reason, the preferable ranges of the amount of Y, the amount of Hf, and the amount of Re are respectively 0.0001 to 0.0050% and the preferable range of the amount of W is 0.01 to 0.50%.

Further, in the present invention, to secure the hardenability of the base material steel plate and HAZ of the welded steel pipe, make the area ratio of bainite of the base material 80% or more, and form intragranular bainite at the HAZ, the carbon equivalent Ceq of the following formula 1 calculated from the content (mass %) of the C, Mn, Ni, Cu, Cr, Mo, and V is made 0.30 to 0.53.

$$Ceq=C+Mn/6+(Ni+Cu)/15+(Cr+Mo+V)/5 \quad \text{formula 1}$$

Further, to secure the low temperature toughness of the base material and HAZ, crack susceptibility parameter Pcm of the following formula 2 calculated from the content (mass %) of the C, Si, Mn, Cu, Cr, Ni, Mo, V, and B is made 0.10 to 0.20.

$$Pcm=C+Si/30+(Mn+Cu+Cr)/20+Ni/60+Mo/15+V/10+5B \quad \text{formula 2}$$

Note that the selectively included elements Ni, Cu, Cr, and V are impurities when less than the above-mentioned preferred lower limits, so are entered as "0" in the above formula 1 and formula 2.

If the metal structure of the base material steel plate used for the welded steel pipe has an area ratio of bainite of 80% or more and an area ratio of polygonal ferrite of 20% or less, the balance of strength and toughness becomes good. Further, if the formation of mainly Ti oxides results in the effective crystal grain size being made 20 µm or less, the base material steel plate becomes good in toughness. Note that, polygonal ferrite is also effective for making the base material steel plate finer in effective crystal grain size. An area ratio of 3% or more is preferable. Further, the thickness of the base material steel plate is preferably 25 mm or more and the tensile strength in the direction corresponding to the circumferential direction of the steel pipe is preferably 600 MPa or more. This is to prevent fracture due to internal pressure at the time of use as line pipe. Note that, when raising the internal pressure is necessary, the thickness of the base material steel plate is preferably made 30 mm or more. On the other hand, the thickness of the base material steel plate is preferably 40 mm or less and the tensile strength in the direction corresponding to the circumferential direction of the steel pipe is preferably 800 MPa or less. This is because due to the rise in thickness and the rise in the tensile strength, the load when forming the base material steel plate by the UO process increases. Note that, usually, the "direction corresponding to the circumferential direction of the steel pipe" is the plate width direction of the base material steel plate.

Next, the method of production will be explained.

After making the steel by the above-mentioned steelmaking process, it is cast to a steel slab. The casting may be performed by an ordinary method, but from the viewpoint of the productivity, continuous casting is preferable. The steel slab is heated for hot rolling.

The heating temperature of the hot rolling is made 1000° C. or more. This is to perform the hot rolling at a temperature where the structure of the steel becomes an austenite single phase, that is, the austenite region, and to make the base material steel plate finer in crystal grain size. The upper limit is not defined, but to suppress coarsening of the effective crystal grain size, making the reheating temperature 1250° C. or less is preferable.

The hot rolling may be immediately started after extraction from the heating furnace, so the starting temperature of the hot rolling is not particularly defined. To make the effective crystal grain size of the base material steel plate finer, the rolling ratio at the recrystallization region over 900° C. is preferably made 2.0 or more. The rolling ratio at the recrystallization region is the ratio of the plate thickness of the steel slab and the plate thickness at 900° C.

Next, if making the rolling ratio at the pre-recrystallization region at 900° C. or less 2.5 or more, after water cooling, the effective crystal grain size of the base material steel plate becomes 20 μm or less. To make the effective crystal grain size of the base material steel plate finer, making the rolling ratio at the pre-recrystallization region at 900° C. or less 3.0 or more is preferable. Note that, in the present invention, the "rolling ratio of the pre-recrystallization region rolling" means the ratio of the plate thickness at 900° C. divided by the plate thickness after the end of the rolling. Further, the upper limits of the rolling ratios at the pre-recrystallization region and recrystallization region are not defined, but if considering the plate thickness of the steel slab before rolling and the plate thickness of the base material steel plate after rolling, the limits are usually 12.0 or less.

The rolling end temperature is preferably the temperature where the structure of the base material steel plate becomes the austenite single phase or more during the hot rolling. That is, the rolling end temperature is preferably made $Ar_3$ or more, but it is all right for a small amount of polygonal ferrite to be formed during rolling, so the temperature may be made $Ar_3$-50° C. or more. $Ac_3$ and $Ar_3$ can be calculated by the contents (mass %) of the C, Si, Mn, P, Cr, Mo, W, Ni, Cu, Al, V, and Ti.

$$Ac_3=910-203\sqrt{C}-15.2Ni+44.7Si+104V+31.5Mo+13.1W-30Mn-11Cr-20Cu+700P+400Al+400Ti$$

$$Ar_3=910-310C-55Ni-80Mo-80Mn-15Cr-20Cu$$

Further, after the end of the rolling, the sheet is water cooled. If the water cooling stop temperature is made 600° C. or less, the above-mentioned metal structure is obtained and the base material steel plate becomes excellent in toughness. The lower limit of the water cooling stop temperature is not defined. Water cooling may be performed until room temperature, but if considering the productivity and hydrogen defects, 150° C. or more is preferable. The steel of the present invention has a composition of ingredients containing B and raising the hardenability, so even if air cooling after ending the rolling, bainite easily forms, but depending on the composition of ingredients and the heating temperature, sometimes polygonal ferrite is formed and the area ratio of bainite becomes less than 80%.

When forming the base material steel plate into a pipe shape, then arc welding the abutted parts to obtain welded steel pipe, the steel plate is preferably shaped by the UOE process using a C-press, U-press, and O-press.

For the arc welding, from the viewpoint of the toughness of the weld metal and productivity, it is preferable to employ submerged arc welding. In particular, when producing welded steel pipe having a thickness of 25 to 40 mm, it is preferable to make the heat input of the submerged arc welding from the inner and outer surfaces 4.0 to 10.0 kJ/mm. If in this range of heat input, in welded steel pipe of the present invention having the above-mentioned composition of ingredients, intragranular bainite forms in the HAZ, the HAZ effective crystal grain size becomes 150 μm or less, and a superior low temperature toughness is obtained.

In particular, this is because when performing the submerged arc welding one pass at a time from the inner and outer surfaces, if making the heat input less than 4.0 kJ/mm, weld metal of the tack welding performed before the main welding sometimes remains between the inner surface metal and outer surface metal. Further, if making the heat input of the submerged arc welding 10.0 kJ/mm or less, even with steel pipe of a thickness of 25 to 40 mm, the old austenite grain size of the HAZ can be made 500 μm or less. This is effective for raising the toughness. Note that, the heat input when welding from the inner surface and the heat input when welding from the outer surface do not have to be made the same conditions. Some difference in heat input is also possible.

If making the heat inputs of the submerged arc welding from the inner and outer surfaces 4.0 to 10.0 kJ/mm, when the thickness of the welded steel pipe is 25 to 40 mm, the cooling speed from 800° C. to 500° C. at the time of cooling the HAZ becomes 2 to 15° C./s. Even with a cooling speed slower than usual, in the welded steel pipe of the present invention having the above-mentioned composition of ingredients, intragranular bainite forms in the HAZ, the HAZ becomes 150 μm or less in effective crystal grain size, and a superior low temperature toughness is obtained.

Further, the wire used for the welding is preferably made the following ingredients so as to make the composition of ingredients of the weld metal the range explained later considering dilution of the ingredients by the base material steel plate. That is, it is a composition of ingredients containing, by mass %, C: 0.010 to 0.120%, Si: 0.05 to 0.50%, Mn: 1.0 to 2.5%, and Ni: 2.0 to 8.5%, further containing Al: 0.100% or less and Ti: 0.050% or less, and having a balance of Fe and unavoidable impurities. B may be included in an amount of 0.0001 to 0.0050%, and one or more of Cr, Mo, and V may be included in a range of Cr+Mo+V of 1.0 to 5.0%.

Further, the composition of ingredients of the weld metal will be explained.

C is an element extremely effective for improving the strength. Inclusion of 0.010% or more is preferable. However, if the amount of C is too great, weld low temperature cracks easily occur. In particular, sometimes the HAZ at the so-called T-cross part where the local weld zone and seam welding cross hardens and the toughness is impaired. For this reason, making the upper limit of the amount of C 0.100% is preferable. To improve the toughness of the weld metal, it is more preferable to make the upper limit 0.050% or less.

Si is preferably included in an amount of 0.01% or more so as to prevent the weld defect of blowholes. On the other hand, if excessively included, the low temperature toughness is remarkably degraded, so the upper limit is preferably made 0.50% or less. In particular, when performing the welding a plurality of times, sometimes the low temperature toughness of the reheated weld metal deteriorates, so the upper limit is more preferably made 0.40% or less.

Mn is an element effective for securing a superior balance of strength and toughness. A lower limit of 1.0% or more is preferable. However, if Mn is included in a large amount, segregation is promoted. Not only is the low temperature toughness degraded, but also production of the weld wire used for welding becomes difficult, so the upper limit is preferably made 2.0% or less.

P and S are impurities. To reduce the deterioration of the low temperature toughness and low temperature crack susceptibility of the weld metal, the upper limits of these are preferably made 0.020% and 0.010% or less. Note that, from the viewpoint of the low temperature toughness, the more preferable upper limit of P is 0.010%.

Al is an element added for improving the refining and solidification when producing weld wire. To utilize the fine Ti-based oxides to suppress the coarsening of the grain size of the weld metal, inclusion of 0.001% or more of Al is preferable. However, Al is an element promoting the formation of MA, so the preferable upper limit of the content is made 0.100% or less.

Ti is an element forming fine oxides serving as nuclei for intragranular transformation and contributing to increased fineness of the grain size of the weld metal. Inclusion of 0.003% or more is preferable. On the other hand, if including Ti in a large amount, a large number of carbides of Ti is formed and the low temperature toughness is degraded, so the upper limit is preferably made 0.050% or less.

O is an impurity. The amount of oxygen finally remaining in the weld metal is usually 0.0001% or more. However, when the amount of O remains over 0.0500%, the number of coarse oxides increases and the toughness of the weld metal sometimes falls, so the upper limit is preferably made 0.0500% or less.

The weld metal further preferably selectively includes Ni, Cr, Mo, and V.

Ni is an element raising the hardenability and securing strength and, further, improving the low temperature toughness. Inclusion of 0.2% or more is preferable. On the other hand, if the content of Ni becomes too great, high temperature cracks sometimes are formed, so the upper limit was made 3.2% or less.

Cr, Mo, and V are all elements raising the hardenability. To increase the strength of the weld metal, one or more of these may be included in a total of 0.2% or more. On the other hand, if the total of one or more of Cr, Mo, and V exceeds 2.5%, the low temperature toughness sometimes deteriorates, so the upper limit is preferably made 2.5% or less.

The weld metal may further contain B.

B is an element increasing the hardenability of the weld metal. To raise the strength, inclusion of 0.0001% or more is preferable. On the other hand, if the content of B is over 0.0050%, the toughness is sometimes impaired, so the upper limit is preferably made 0.0050% or less.

The weld metal sometimes includes other elements due to dilution from the base material steel plate, for example, the Cu, Nb, Zr, Ta, Mg, Ca, REM, Y, Hf, Re, W, etc. selectively added to the base material, and sometimes includes the Zr, Nb, Mg, and other elements added in accordance with need to improve the refining and solidification of the weld wire. These are unavoidably included impurities.

To improve the circularity of the steel pipe after the seam welding, the pipe may be expanded. When increasing the circularity of the steel pipe by expanding it, deformation to the plastic region is required, so the pipe expansion rate has to be made 0.7% or more. The pipe expansion rate shows the difference of the outer circumferential length of the steel pipe after expansion and the outer circumferential length of the steel pipe before expansion divided by the outer circumferential length of the steel pipe before expansion expressed as a percentage. If the pipe expansion rate is made over 2%, sometimes the plastic deformations of the base material and the weld zone cause a drop in the toughness. Therefore, the pipe expansion rate is preferably made 0.7 to 2.0%.

Further, the weld zone and HAZ of the steel pipe are preferably heat treated. In particular, if heating to 300 to 500° C. in temperature, the coarse MA formed along the old austenite grain boundaries breaks down into bainite and fine cementite and the toughness is improved. If the heating temperature is less than 300° C., sometimes the coarse MA does not sufficiently break down and the effect of improvement of the toughness is not sufficient, so the lower limit is preferably made 300° C. or more. On the other hand, if heating the weld zone to over 500° C., precipitates form and the toughness of the weld metal sometimes deteriorates, so the upper limit is preferably made 500° C. or less. If the MA formed at the reheated HAZ breaks down into bainite and cementite, in observation by an SEM, the shape is similar to MA, but fine white precipitates are included inside and differentiation from MA becomes possible.

The weld zone and HAZ may be heat treated by heating from the outer surface by a burner or by high frequency heating. The pipe may be immediately cooled after its outer surface reaches the heat treatment temperature, but preferably it is held there for 1 to 600 seconds to promote the breakdown of the MA. However, if considering the cost of the facilities and the productivity, the holding time is preferably made 300 seconds or less.

EXAMPLES

Next, examples of the present invention will be explained.

Steels having the chemical ingredients of Table 1 with the oxygen concentrations at the time of adding Ti adjusted to 0.001 to 0.003% in range were produced and made into steel slabs having the chemical ingredients of Table 1 and thicknesses of 240 mm. These steel slabs were heated to the heating temperatures shown in Table 2 and hot rolled to 45 to 160 mm in the recrystallization temperature regions of 950° C. or more. Further, the hot rolling operations were performed up to the plate thicknesses shown in Table 2 in the pre-recrystallization regions of the temperature range of 880° C. to 800° C. and by the rolling ratios shown in Table 2. The end temperatures of the hot rolling operations were made $Ar_{\alpha}$-50° C. or more. The water cooling was started at 750° C. and was stopped at various temperatures.

V-notch test pieces having the plate width direction as the longitudinal direction and having notches provided in parallel with the plate thickness direction were prepared from the obtained steel plates based on JIS Z 2242. The sampling positions of the Charpy test pieces were made the surface layer parts, that is, positions about 2 to 12 mm from the surfaces, and the ½t parts, that is, the substantial centers in the thickness. Charpy tests were run at −40° C. to find the absorption energy. The tensile properties were evaluated using API standard test pieces. Note that when forming a base material steel plate having a plate thickness of 25 to 40 mm into a welded steel pipe, the small extent of the effect of the strain introduced by the shaping process at the center part of plate thickness is confirmed by analysis by the finite element method. Further, the steel plates were cold worked to make welded steel pipes which were checked for the effects of work hardening. As a result, the TS sometimes rose 20 to 30 MPa or so. The toughness was little affected at both the center part of plate thickness and the surface layer part. This was the extent of measurement error.

The microstructures of the center parts of plate thicknesses of the base material steel plates were observed under an optical microscope, the area ratios of the polygonal ferrite and bainite were measured, and the residual structures were confirmed. The base material steel plates were measured for effective crystal grain size by EBSP.

TABLE 1

| Prod. No. | Ingredients (mass %) | | | | | | | | | | |
|---|---|---|---|---|---|---|---|---|---|---|---|
| | C | Si | Mn | P | S | Al | Ti | Mo | B | O | Cu |
| 1 | 0.030 | 0.08 | 1.85 | 0.006 | 0.0004 | 0.006 | 0.012 | | 0.0008 | 0.0030 | |
| 2 | 0.049 | 0.15 | 1.90 | 0.007 | 0.0015 | 0.003 | 0.008 | | 0.0007 | 0.0025 | |
| 3 | 0.045 | 0.17 | 1.90 | 0.005 | 0.0022 | 0.008 | 0.010 | 0.01 | 0.0009 | 0.0020 | 0.06 |
| 4 | 0.050 | 0.29 | 1.86 | 0.008 | 0.0004 | 0.004 | 0.021 | | 0.0012 | 0.0021 | |
| 5 | 0.039 | 0.48 | 1.96 | 0.002 | 0.0023 | 0.005 | 0.010 | | 0.0011 | 0.0016 | |
| 6 | 0.046 | 0.28 | 1.50 | 0.010 | 0.0003 | 0.005 | 0.020 | 0.05 | 0.0012 | 0.0013 | |
| 7 | 0.015 | 0.12 | 2.00 | 0.003 | 0.0005 | 0.004 | 0.012 | | 0.0006 | 0.0014 | |
| 8 | 0.032 | 0.31 | 1.80 | 0.002 | 0.0008 | 0.005 | 0.015 | | 0.0012 | 0.0023 | |
| 9 | 0.032 | 0.05 | 1.96 | 0.002 | 0.0015 | 0.004 | 0.010 | | 0.0015 | 0.0009 | |
| 10 | 0.048 | 0.05 | 1.96 | 0.005 | 0.0022 | 0.054 | 0.015 | | 0.0012 | 0.0016 | |
| 11 | 0.050 | 0.12 | 1.85 | 0.010 | 0.0015 | 0.007 | 0.001 | | 0.0011 | 0.0018 | |

TABLE 1-continued

| | | | | | | | | | | | |
|---|---|---|---|---|---|---|---|---|---|---|---|
| 12 | 0.048 | 0.05 | 1.96 | 0.005 | 0.0019 | 0.006 | 0.010 | | 0.0008 | 0.0009 | |
| 13 | 0.043 | 0.22 | 1.85 | 0.004 | 0.0021 | 0.004 | 0.008 | | 0.0008 | 0.0020 | |
| 14 | 0.015 | 0.10 | 1.20 | 0.008 | 0.0020 | 0.002 | 0.015 | 0.08 | 0.0005 | 0.0025 | |
| 15 | 0.050 | 0.25 | 2.00 | 0.010 | 0.0025 | 0.005 | 0.015 | 0.05 | 0.0010 | 0.0023 | 0.40 |

| Prod. No. | Ingredients (mass %) | | | | | | |
|---|---|---|---|---|---|---|---|
| | Ni | Cr | V | Nb | Zr, Ta | Mg, Ca, REM, Y, Hf, Re, W | Ceq | Pcm |
| 1 | | | | 0.010 | | | 0.34 | 0.13 |
| 2 | | | 0.050 | 0.020 | | Mg: 0.0020 | 0.38 | 0.16 |
| 3 | 0.06 | | | | | Hf: 0.0010, Re: 0.0010 | 0.37 | 0.15 |
| 4 | | | 0.030 | | | W: 0.2 | 0.36 | 0.16 |
| 5 | | | 0.040 | 0.030 | | Y: 0.0010 | 0.37 | 0.16 |
| 6 | | | | | Ta: 0.0003 | Ca: 0.0006, REM: 0.0006 | 0.31 | 0.14 |
| 7 | | | | 0.010 | | Ca: 0.0017, REM: 0.0010 | 0.35 | 0.12 |
| 8 | | 0.03 | 0.025 | 0.015 | Zr: 0.0400 | | 0.34 | 0.14 |
| 9 | | | | | | | 0.36 | 0.14 |
| 10 | | 0.25 | 0.045 | 0.012 | Zr: 0.0010 | | 0.43 | 0.17 |
| 11 | | | 0.015 | 0.020 | | Ca: 0.0006 | 0.36 | 0.15 |
| 12 | | | | 0.025 | | REM: 0.0010 | 0.37 | 0.15 |
| 13 | | | 0.050 | 0.030 | Zr: 0.0010 | | 0.36 | 0.15 |
| 14 | | | | 0.015 | | Mg: 0.0026 | 0.23 | 0.09 |
| 15 | 0.60 | 0.30 | 0.040 | 0.010 | | Ca: 0.0025 | 0.53 | 0.22 |

* Ceq = C + Mn/6 + (Ni + Cu)/15 + (Cr + Mo + V)/5
* Pcm = C + Si/30 + (Mn + Cu + Cr)/20 + Ni/60 + Mo/15 + V/10 + 5B.
* Blank fields in ingredients indicate no addition.
* Underlines in table indicate outside range of present invention.

TABLE 2

| Production No. | Heating temperature °C. | Rolling ratio | Water cooling stop temperature °C. | Heat treatment temperature °C. | Plate thickness mm |
|---|---|---|---|---|---|
| 1 | 1025 | 3.4 | 290 | 450 | 30 |
| 2 | 1030 | 3.4 | 550 | 380 | 29 |
| 3 | 1060 | 3.7 | 560 | | 34 |
| 4 | 1045 | 2.8 | 450 | 420 | 38 |
| 5 | 1035 | 3.4 | 300 | | 35 |
| 6 | 1010 | 3.5 | 290 | 350 | 29 |
| 7 | 1025 | 3.9 | 100 | | 34 |
| 8 | 1035 | 4.5 | 320 | | 32 |
| 9 | 1040 | 4.1 | 350 | 300 | 31 |
| 10 | 1080 | 3.5 | 520 | | 32 |
| 11 | 1030 | 4.5 | 550 | | 35 |
| 12 | 1040 | 1.5 | 300 | 460 | 32 |
| 13 | 1060 | 3.3 | Air-cooled | | 38 |
| 14 | 1030 | 3.5 | 450 | | 34 |
| 15 | 1050 | 3.3 | 500 | | 33 |

* Rolling ratio is rolling ratio at 900° C. or less until end of rolling
* Blank fields in heat treatment indicate no heat treatment.
* Underlines in table indicate outside range of present invention.

Next, considering dilution by the base material steel plates, weld wires having compositions of ingredients containing, by mass %, C: 0.010 to 0.120%, Si: 0.05 to 0.5%, Mn: 1.0 to 2.5%, Al: 0.100% or less, and Ti: 0.050% or less, further containing, in accordance with need, Ni: 2.0 to 8.5% and one or more of Cr, Mo, V in Cr+Mo+V: 1.0 to 5.0% in range, containing B: 0.0001 to 0.0050%, and having balances of Fe and unavoidable impurities were used for submerged arc welding by weld heat inputs of 4.0 to 10.0 kJ/mm one pass each from the inner and outer surfaces to prepare weld joints. Further, some of the joints were heat treated at the temperatures shown in Table 2. Note that samples were taken from the weld metals and analyzed for ingredients. The tensile strengths of the weld metals were measured based on JIS Z 3111. The chemical ingredients and tensile strengths of the weld metals are shown in Table 3.

TABLE 3

| Prod. No. | Weld metal ingredients (mass %) | | | | | | | | | | Heat input kJ/mm | Weld metal Strength (MPa) |
|---|---|---|---|---|---|---|---|---|---|---|---|---|
| | C | Si | Mn | P | S | Al | Ti | O | N | Ce + Mo + V | | |
| 1 | 0.057 | 0.24 | 1.5 | 0.009 | 0.001 | 0.010 | 0.015 | 0.0160 | 0.5 | | 6.4 | 720 |
| 2 | 0.045 | 0.18 | 1.6 | 0.008 | 0.002 | 0.011 | 0.013 | 0.0170 | | | 6.2 | 640 |
| 3 | 0.046 | 0.12 | 1.4 | 0.005 | 0.004 | 0.010 | 0.009 | 0.0190 | | | 7.0 | 650 |
| 4 | 0.045 | 0.10 | 1.9 | 0.007 | 0.002 | 0.009 | 0.010 | 0.0220 | | | 5.8 | 670 |

TABLE 3-continued

| Prod. No. | Weld metal ingredients (mass %) | | | | | | | | | | Heat input kJ/mm | Weld metal Strength (MPa) |
|---|---|---|---|---|---|---|---|---|---|---|---|---|
| | C | Si | Mn | P | S | Al | Ti | O | N | Ce + Mo + V | | |
| 5 | 0.065 | 0.11 | 1.7 | 0.006 | 0.001 | 0.008 | 0.012 | 0.0230 | | | 5.5 | 640 |
| 6 | 0.075 | 0.21 | 1.6 | 0.007 | 0.001 | 0.008 | 0.013 | 0.0220 | | 0.3 | 7.5 | 720 |
| 7 | 0.041 | 0.26 | 1.5 | 0.006 | 0.002 | 0.010 | 0.007 | 0.0250 | 1.0 | | 6.5 | 750 |
| 8 | 0.046 | 0.30 | 1.6 | 0.005 | 0.001 | 0.008 | 0.014 | 0.0230 | 0.5 | 0.2 | 6.4 | 740 |
| 9 | 0.080 | 0.32 | 1.7 | 0.008 | 0.002 | 0.007 | 0.012 | 0.0240 | | | 6.2 | 630 |
| 10 | 0.056 | 0.17 | 1.5 | 0.006 | 0.002 | 0.021 | 0.018 | 0.0230 | | | 7.1 | 670 |
| 11 | 0.062 | 0.26 | 1.6 | 0.007 | 0.002 | 0.006 | 0.012 | 0.0190 | 0.7 | | 5.6 | 740 |
| 12 | 0.052 | 0.21 | 1.6 | 0.008 | 0.002 | 0.006 | 0.010 | 0.0200 | | | 6.5 | 700 |
| 13 | 0.050 | 0.18 | 1.8 | 0.006 | 0.003 | 0.007 | 0.013 | 0.0220 | | | 6.4 | 690 |
| 14 | 0.060 | 0.24 | 1.6 | 0.007 | 0.002 | 0.008 | 0.016 | 0.0240 | | | 6.6 | 690 |
| 15 | 0.045 | 0.15 | 1.5 | 0.008 | 0.003 | 0.006 | 0.012 | 0.0200 | | | 6.2 | 650 |

Small pieces were taken from the weld joints. The effective crystal grain sizes of their HAZ's were measured by EBSP. Further, bainite formed into petal shapes starting from the inclusions was defined as the intragranular bainite and measured for area ratio. Further, the Charpy absorption energy of the HAZ was measured based on JIS Z 2242 using V-notch test pieces at −40° C. V-notches were provided at positions 1 mm at the base material side from the weld lines. The measurement was conducted at −40° C. Further, the width direction vertical to the weld metal was made the longitudinal direction of the test piece, the weld metal was made the substantial center of the parallel part, API standard test pieces were taken, and tensile tests were performed to judge the fracture position. The results are shown in Table 4. The intragranular transformed structure of Table 4 is the area ratio of the intragranular bainite.

Note that some of the base material steel plates were shaped by the UO process, welded by submerged arc welding, and expanded to obtain steel pipes which were investigated for microstructures and mechanical properties. These were confirmed to be equivalent to the microstructures and mechanical properties of the based materials of the steel plates and HAZs of the joints.

Production Nos. 1 to 9 are invention examples. The base material steel plates had effective crystal grain sizes of 20 μm or less and the HAZ's had effective crystal grain sizes of 150 μm or less. Further, the base materials and HAZ's had Charpy absorption energies at −40° C. exceeding 50 J and good low temperature toughnesses. In these invention examples, the fracture positions in the tensile tests of the joints were the base material steel plates, and softening of the HAZ did not become a problem. Note that, Production No. 9 is an example where the heat treatment temperature was low and, compared with the case of heat treatment at a preferable temperature, the effect of improvement of the low temperature toughness was somewhat small.

On the other hand, Production Nos. 10, 11, 14, and 15 had ingredients of the base material steel plates outside the range of the present invention, while Production Nos. 12 and 13 had production conditions outside the range of the present invention. These are comparative examples. Among these, Production No. 10 had a large amount of Al and Production No. 11 had a small amount of Ti, so the intragranular bainite was reduced and, further, the low temperature toughness of the HAZ fell.

TABLE 4

| | Metal structure of base material | | | | Metal structure of HAZ | | Base material | | | | Joint tensile | | |
|---|---|---|---|---|---|---|---|---|---|---|---|---|---|
| Prod. No. | Bainite % | Polygonal ferrite % | Balance % | Effective crystal grain size μm | Effective crystal grain size μm | Intragranular transformed structure % | Tensile strength MPa | Surface layer vE−40(J) | ½t vE−40(J) | HAZ vE−40 J | test Breakage position | Remarks |
| 1 | 93 | 5 | 2 | 9 | 105 | 72 | 630 | 333 | 150 | 85 | Base material | Inv. ex. |
| 2 | 96 | 1 | 3 | 5 | 108 | 71 | 679 | 204 | 155 | 95 | Base material | |
| 3 | 98 | 1 | 1 | 4 | 120 | 68 | 645 | 222 | 150 | 105 | Base material | |
| 4 | 96 | 2 | 2 | 15 | 128 | 65 | 700 | 200 | 151 | 104 | Base material | |
| 5 | 96 | 3 | 1 | 10 | 125 | 71 | 619 | 256 | 160 | 95 | Base material | |
| 6 | 92 | 5 | 3 | 8 | 91 | 75 | 616 | 217 | 155 | 96 | Base material | |
| 7 | 90 | 7 | 3 | 10 | 96 | 66 | 625 | 400 | 157 | 120 | Base material | |
| 8 | 90 | 7 | 3 | 9 | 115 | 70 | 672 | 313 | 160 | 115 | Base material | |
| 9 | 91 | 5 | 4 | 12 | 95 | 75 | 652 | 250 | 167 | 100 | Base material | |
| 10 | 92 | 7 | 1 | <u>22</u> | 164 | <u>28</u> | 658 | 208 | 175 | 32 | Base material | Comp. ex. |
| 11 | 95 | 3 | 2 | <u>25</u> | 175 | <u>18</u> | 720 | 200 | 158 | 24 | Base material | |
| 12 | 90 | 8 | 2 | <u>30</u> | 100 | 65 | 658 | 130 | 50 | 103 | Base material | |
| 13 | 70 | 22 | 8 | 11 | 120 | 64 | 532 | 480 | 175 | 115 | Base material | |
| 14 | 76 | 21 | 3 | 10 | 100 | 65 | 515 | 470 | 170 | 100 | Base material | |
| 15 | 99 | 1 | 0 | 13 | 120 | 62 | 950 | 125 | 95 | 80 | HAZ | |

* Balance is total of area ratios of residual austenite, martensite, and MA
* Intragranular transformed structure is area ratio of intragranular bainite.
* Underlines in table indicate outside range of present invention.

Production No. 12 is an example where the rolling ratio at 900° C. or less was small, the effective crystal grain size of the base material steel plate became larger, and the low temperature toughness of the base material steel plate fell. Further, Production No. 13 is an example of air cooling after rolling, so the area ratio of the polygonal ferrite of the base material increased and the strength dropped. Production No. 14 is an example where the Ceq and Pcm were low, so the strength fell. Production No. 15 is an example where the Ceq and Pcm were high, so the strength was high and the toughness of the base material steel plate fell. Further, the strength of the base material steel plate was high, so the sample broke at the HAZ as a result of a tensile test of the joint.

INDUSTRIAL APPLICABILITY

According to the present invention, even if the content of Mo is lowered, the low temperature toughness of the HAZ of the welded steel pipe for line pipe can be secured, and inexpensive, high strength welded steel pipe for line pipe superior in low temperature toughness and a method of production of the same can be provided. Further, according to the present invention, the low temperature toughness of thick high strength welded steel pipe for line pipe having a thickness of 25 mm or more and, further, 30 mm or more, can be secured. The contribution to industry is remarkable.

The invention claimed is:

1. High strength welded steel pipe for line pipe superior in low temperature toughness, the high strength welded steel pipe comprising steel pipe obtained by seam welding a base material steel plate formed into a pipe shape, wherein said base material steel plate comprises, by mass %,
  C: 0.010 to 0.050%,
  Si: 0.01 to 0.50%,
  Mn: 0.50 to 2.00%,
  S: 0.0001 to 0.0050%,
  Ti: 0.003 to 0.030%,
  O: 0.0001 to 0.0080%,
  B: 0.0003 to 0.0030%, and
  a balance of iron and unavoidable impurities, wherein P, Al, and Mo are present at most as impurities, and
  P is limited to 0.050% or less,
  Al is limited to 0.020% or less, and
  Mo is limited to less than 0.10%, and wherein
  Ceq found from the formula, $Ceq=C+Mn/6+(Ni+Cu)/15+(Cr+Mo+V)/5$, is 0.30 to 0.53,
  Pcm found by the formula, $Pcm=C+Si/30+(Mn+Cu+Cr)/20+Ni/60+Mo/15+V/10+5B$, is 0.10 to 0.20, wherein C, Si, Mn, Ni, Cu, Cr, Mo, V, and B are the amounts of the individual elements in mass %, and wherein
  a metal structure of said base material steel plate has a polygonal ferrite area ratio of no more than 20%,
  a bainite area ratio of at least 80%,
  an effective crystal grain size of no more than 20 μm, and
  an effective crystal grain size in a weld heat affected zone of no more than 150 μm.

2. The high strength welded steel pipe as set forth in claim 1, wherein the base material steel plate has a thickness of 25 to 40 mm.

3. The high strength welded steel pipe as set forth in claim 1, wherein said base material steel plate has a tensile strength measured using a circumferential direction of said steel pipe as the tension direction of 600 to 800 MPa.

4. The high strength welded steel pipe as set forth in claim 1, wherein said base material steel plate further comprises, by mass %, one or both of
  Cu: 0.05 to 1.50% and
  Ni: 0.05 to 5.00%.

5. The high strength welded steel pipe as set forth in claim 1, wherein said base material steel plate further comprises, by mass %, one or more of
  Cr: 0.02 to 1.50%,
  V: 0.010 to 0.100%,
  Nb: 0.001 to 0.200%,
  Zr: 0.0001 to 0.0500%, and
  Ta: 0.0001 to 0.0500%.

6. The high strength welded steel pipe as set forth in claim 1, wherein said base material steel plate further comprises, by mass %, one or more of
  Mg: 0.0001 to 0.0100%,
  Ca: 0.0001 to 0.0050%,
  REM: 0.0001 to 0.0050%,
  Y: 0.0001 to 0.0050%,
  Hf: 0.0001 to 0.0050%,
  Re: 0.0001 to 0.0050%, and
  W: 0.01 to 0.50%.

7. The high strength welded steel pipe as set forth in claim 1, wherein the steel pipe further comprises a weld metal, the weld material comprising, by mass %,
  C: 0.010 to 0.100%,
  Si: 0.01 to 0.50%,
  Mn: 1.0 to 2.0%,
  Al: 0.001 to 0.100%,
  Ti: 0.003 to 0.050%,
  O: 0.0001 to 0.0500%, and a balance of iron and unavoidable impurities, wherein P and S are present at most as impurities, and
  P is limited to 0.010% or less and
  S is limited to 0.010% or less.

8. The high strength welded steel pipe as set forth in claim 7, said weld metal further comprising, by mass %, one or both of
  Ni: 0.2 to 3.2% and
  Cr+Mo+V:0.2 to 2.5%.

9. A method of production of high strength welded steel pipe for line pipe superior in low temperature toughness, the method comprising:
  adding deoxidizing agents, comprising Si and Mn, before casting the steel,
  then adding Ti to form a steel composition
  casting the steel composition, forming a steel slab,
  hot rolling the steel slab, forming a steel plate, and
  forming the steel plate into a pipe shape having seam portions, and
  seam welding the seam portions; wherein, after adding the Ti, the steel comprises, by Mass %,:
  C: 0.010 to 0.050%,
  Si: 0.01 to 0.50%,
  Mn: 0.50 to 2.00%,
  S: 0.0001 to 0.0050%,
  Ti: 0.003 to 0.030%,
  O: 0.0001 to 0.0080%,
  B: 0.0003 to 0.0030%, and
  a balance of iron and unavoidable impurities, wherein P, Al, and Mo are present at most as impurities, and
  P is limited to 0.050% or less,
  Al is limited to 0.020% or less, and
  Mo is limited to less than 0.10%, and wherein
  Ceq found from the formula $Ceq=C+Mn/6+(Ni+Cu)/15+(Cr+Mo+V)/5$ is 0.30 to 0.53, Pcm found from the formula $$Pcm = C + Si/30 + (Mn + Cu\ 30\ Cr)/20 + Ni/60 + Mo/15 + V/10 + 5B$$

is 0.10 to 0.20, wherein C, Si, Mn, Ni, Cu, Cr, Mo, V, and B are the amounts of the individual elements in mass %.

10. The method of production of high strength welded steel pipe as set forth in claim 9, further comprising heating said steel slab to a temperature of at least 1000° C., hot rolling the heated steel to obtain a rolling ratio in the pre-recrystallization temperature region of 2.5 or more, and water cooling to a temperature of no more than 600° C.

11. The method of production of high strength welded steel pipe as set forth in claim 9, further comprising forming said steel plate into a pipe shape by a UO process, welding seam portions from inner and outer surfaces by submerged arc welding using welding wire and a firing type or molten type flux, and then expanding the pipe.

12. The method of production of high strength welded steel pipe as set forth in claim 11, wherein said submerged arc welding provides a heat input of 4.0 to 10.0 kJ/mm.

13. The method of production of high strength welded steel pipe as set forth in claim 9, further comprising heat treating the seam weld zone.

14. The method of production of high strength welded steel pipe as set forth in claim 13, further comprising heat treating the seam weld zone in a temperature range of 300° to 500° C.

15. The method of production of high strength welded steel pipe as set forth in claim 9, wherein said base material steel plate further comprises, by mass %, one or both of Cu: 0.05 to 1.50% and Ni: 0.05 to 5.00%.

16. The method of production of high strength welded steel pipe as set forth in claim 9, wherein said base material steel plate further comprises, by mass %, one or more of Cr: 0.02 to 1.50%, V: 0.010 to 0.100%, Nb: 0.001 to 0.200%, Zr: 0.0001 to 0.0500%, and Ta: 0.0001 to 0.0500%.

17. The method of production of high strength welded steel pipe as set forth in claim 9, wherein said base material steel plate further comprises, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, Re: 0.0001 to 0.0050%, and W: 0.01 to 0.50%.

* * * * *